(12) United States Patent
Hopper

(10) Patent No.: US 10,260,654 B2
(45) Date of Patent: Apr. 16, 2019

(54) VALVE ASSEMBLY

(71) Applicant: Cameron International Corporation, Houston, TX (US)

(72) Inventor: Hans Paul Hopper, Aberdeen (GB)

(73) Assignee: Cameron International Coporation, Houston, TX (US)

( * ) Notice: Subject to any disclaimer, the term of this patent is extended or adjusted under 35 U.S.C. 154(b) by 83 days.

(21) Appl. No.: 14/971,996

(22) Filed: Dec. 16, 2015

(65) Prior Publication Data

US 2016/0186876 A1    Jun. 30, 2016

(30) Foreign Application Priority Data

Dec. 24, 2014    (GB) .................................. 1423201.1

(51) Int. Cl.
| | | |
|---|---|---|
| *F16K 47/08* | (2006.01) | |
| *E21B 34/02* | (2006.01) | |
| *E21B 34/04* | (2006.01) | |
| *F16K 3/24* | (2006.01) | |
| *F16K 17/168* | (2006.01) | |
| *F16K 5/04* | (2006.01) | |
| *F16K 1/14* | (2006.01) | |
| *F16K 1/22* | (2006.01) | |
| *F16K 47/04* | (2006.01) | |

(52) U.S. Cl.
CPC .............. *F16K 47/08* (2013.01); *E21B 34/02* (2013.01); *E21B 34/04* (2013.01); *F16K 3/246* (2013.01); *F16K 1/14* (2013.01); *F16K 1/22* (2013.01); *F16K 5/04* (2013.01); *F16K 17/168* (2013.01); *F16K 47/04* (2013.01)

(58) Field of Classification Search
CPC .......... F16K 47/08; F16K 3/246; F16K 47/04; F16K 5/04; F16K 17/168; F16K 1/14; F16K 1/22; E21B 34/02; E21B 34/04
USPC .............. 137/625.28, 625.3, 625.33, 625.35, 137/625.38
See application file for complete search history.

(56) References Cited

U.S. PATENT DOCUMENTS

| 234,602 A | 11/1880 | Moore et al. |
| 2,105,681 A | 1/1938 | Harry |
| (Continued) | | |

FOREIGN PATENT DOCUMENTS

| DE | 3515925 A1 | 11/1986 |
| DE | 3615432 A1 | 11/1987 |
| (Continued) | | |

OTHER PUBLICATIONS

PCT International Search Report and Written Opinion; Application No. PCT/US2015/066500; dated May 9, 2016; 14 pages.

(Continued)

*Primary Examiner* — Matthew W Jellett
*Assistant Examiner* — Christopher Ballman
(74) *Attorney, Agent, or Firm* — Fletcher Yoder, P.C.

(57) ABSTRACT

A valve assembly that includes a main valve having a valve member moveable between a closed position and an open position. The main valve has an upstream side and a downstream side. The valve assembly includes a pressure equalizing assembly for equalizing the fluid pressure across the main valve. The pressure equalizing assembly includes a line extending from the upstream side of the main valve to the downstream side of the main valve and a pressure equalizing valve assembly.

24 Claims, 8 Drawing Sheets

(56) References Cited

U.S. PATENT DOCUMENTS

| | | | |
|---|---|---|---|
| 2,233,077 A | | 2/1941 | Gillespie et al. |
| 2,598,187 A | | 5/1952 | Meyer |
| 3,200,842 A | | 8/1965 | Wilson |
| 3,572,382 A | * | 3/1971 | Luthe .................. F16K 39/022 137/625.35 |
| 3,780,767 A | | 12/1973 | Borg et al. |
| 3,813,079 A | | 5/1974 | Baumann et al. |
| 3,821,968 A | | 7/1974 | Barb |
| 3,971,415 A | | 7/1976 | Faller |
| 4,041,982 A | * | 8/1977 | Lindner .................. F16K 47/08 137/625.3 |
| 4,384,592 A | * | 5/1983 | Ng ............................ F16K 3/34 137/625.3 |
| 4,557,463 A | | 12/1985 | Tripp et al. |
| 4,569,370 A | | 2/1986 | Witt |
| 4,617,963 A | * | 10/1986 | Stares .................... F16K 47/08 137/625.3 |
| 4,671,321 A | | 6/1987 | Paetzel et al. |
| 4,848,472 A | | 7/1989 | Hopper |
| 5,005,605 A | | 4/1991 | Kueffer et al. |
| 5,018,703 A | | 5/1991 | Goode |
| 5,086,808 A | * | 2/1992 | Pettus .................... E21B 34/02 137/625.3 |
| 5,236,014 A | | 8/1993 | Buls et al. |
| 5,431,188 A | * | 7/1995 | Cove ...................... E21B 34/02 137/625.3 |
| 5,964,248 A | * | 10/1999 | Enarson ................ F01D 17/143 137/625.37 |
| 6,505,646 B1 | | 1/2003 | Singleton |
| 6,637,452 B1 | * | 10/2003 | Alman .................... F16K 3/243 137/244 |
| 6,782,920 B2 | | 8/2004 | Steinke |
| 6,851,658 B2 | | 2/2005 | Fitzgerald et al. |
| 6,997,211 B2 | * | 2/2006 | Alman .................... F16K 27/02 137/625.33 |
| 7,789,105 B2 | | 9/2010 | Zecchi et al. |
| 8,371,333 B2 | * | 2/2013 | Bohaychuk ............... F16K 3/26 137/625.33 |
| 8,490,652 B2 | | 7/2013 | Bohaychuk et al. |
| 8,522,887 B1 | | 9/2013 | Madison |
| 9,458,941 B2 | | 10/2016 | Bohaychuk |
| 2002/0017327 A1 | | 2/2002 | Kawaai et al. |
| 2003/0024580 A1 | | 2/2003 | Bohaychuk |
| 2003/0226600 A1 | | 12/2003 | Stares et al. |
| 2005/0006150 A1 | | 1/2005 | Sims et al. |
| 2007/0240774 A1 | | 10/2007 | McCarty |
| 2009/0026395 A1 | * | 1/2009 | Perrault .................. F16K 47/08 251/127 |
| 2010/0288389 A1 | | 11/2010 | Hopper et al. |
| 2012/0227813 A1 | | 9/2012 | Meek et al. |
| 2012/0285546 A1 | | 11/2012 | Ter Haar et al. |
| 2016/0186891 A1 | | 6/2016 | Hopper |
| 2016/0186892 A1 | | 6/2016 | Hopper et al. |

FOREIGN PATENT DOCUMENTS

| | | |
|---|---|---|
| DE | 3717128 A1 | 12/1988 |
| EP | 1278979 A1 | 1/2003 |
| EP | 2042684 A1 | 4/2009 |
| EP | 2042685 A1 | 4/2009 |
| GB | 2462879 A | 3/2010 |
| JP | S59140972 A | 8/1984 |

OTHER PUBLICATIONS

PCT Invitation to Pay Additional Fees; Application No. PCT/US2015/066493; dated Apr. 22, 2016; 9 pages.
PCT International Search Report and Written Opinion; Application No. PCT/US2015/066509; dated Aug. 1, 2016; 17 pages.
PCT Invitation to Pay Additional Fees and International Search Report; Application No. PCT/US2015/066509; dated May 9, 2016; 7 pages.
PCT International Search Report and Written Opinion; Application No. PCT/US2015/066493; dated Jul. 25, 2016; 20 pages.
GB Examination Report of Application No. GB1423203.7 dated Mar. 24, 2017; 2 pages.
PCT International Search Report and Written Opinion; Application No. PCT/US2015/066507; dated Jun. 1, 2016; 15 pages.

* cited by examiner

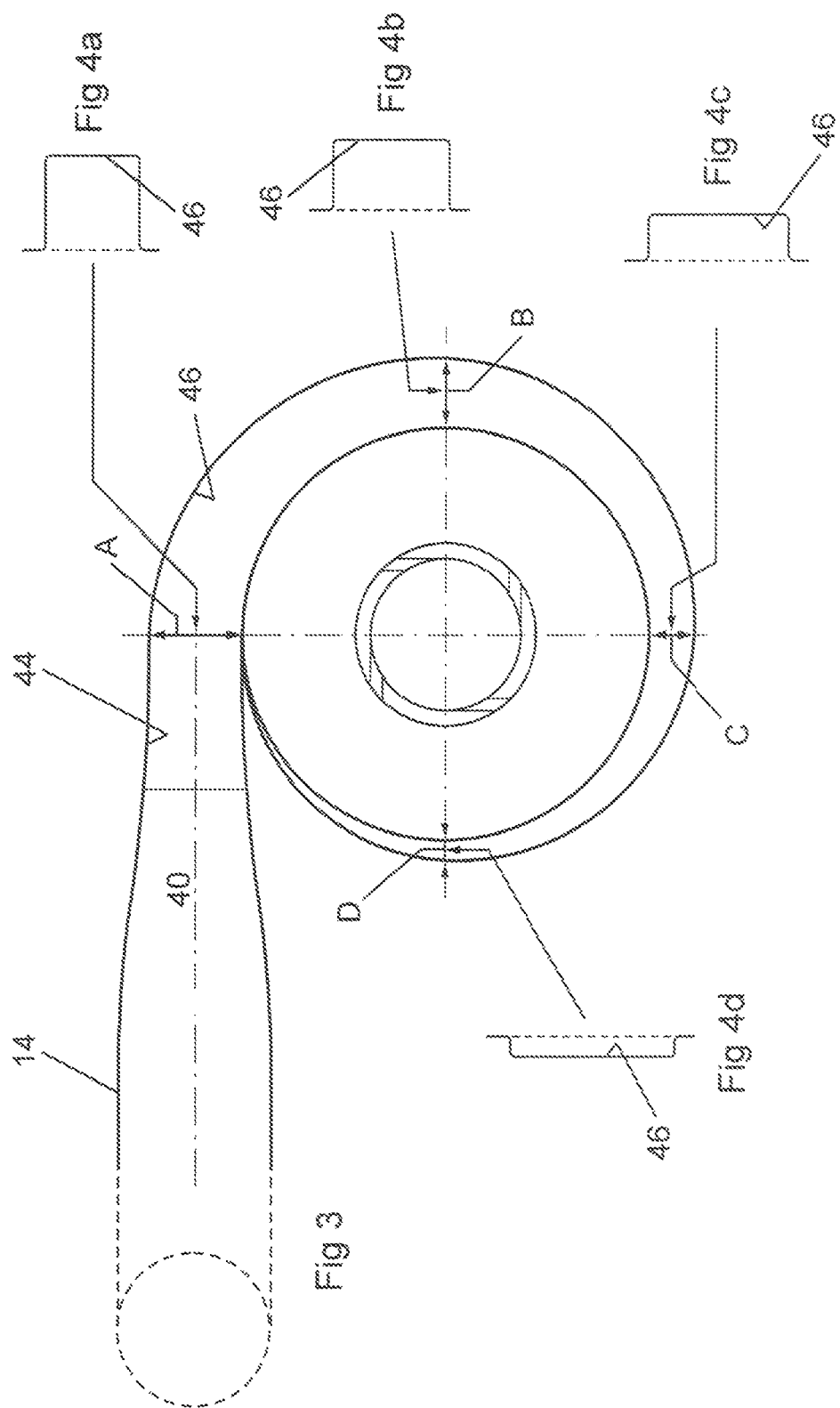

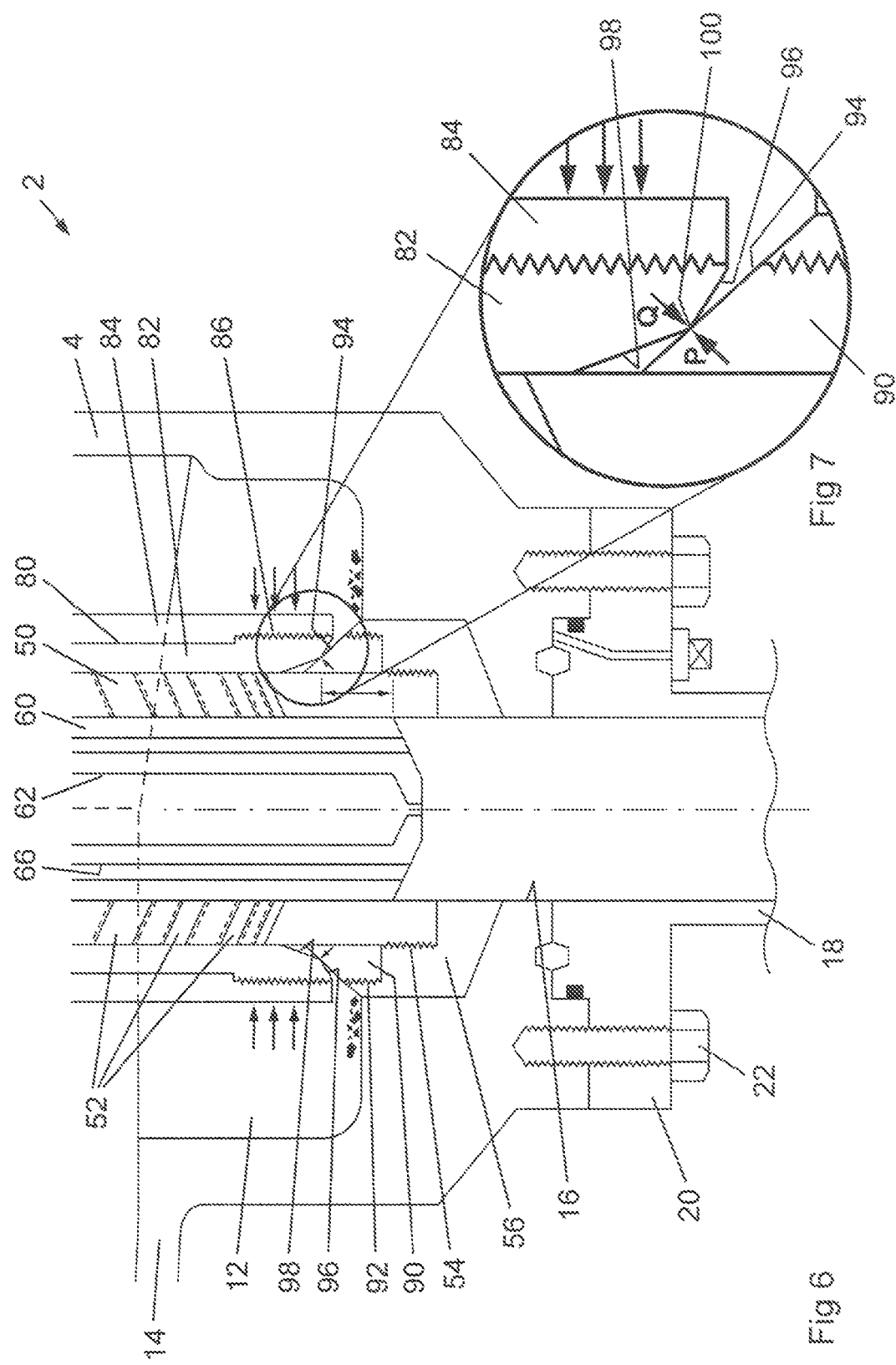

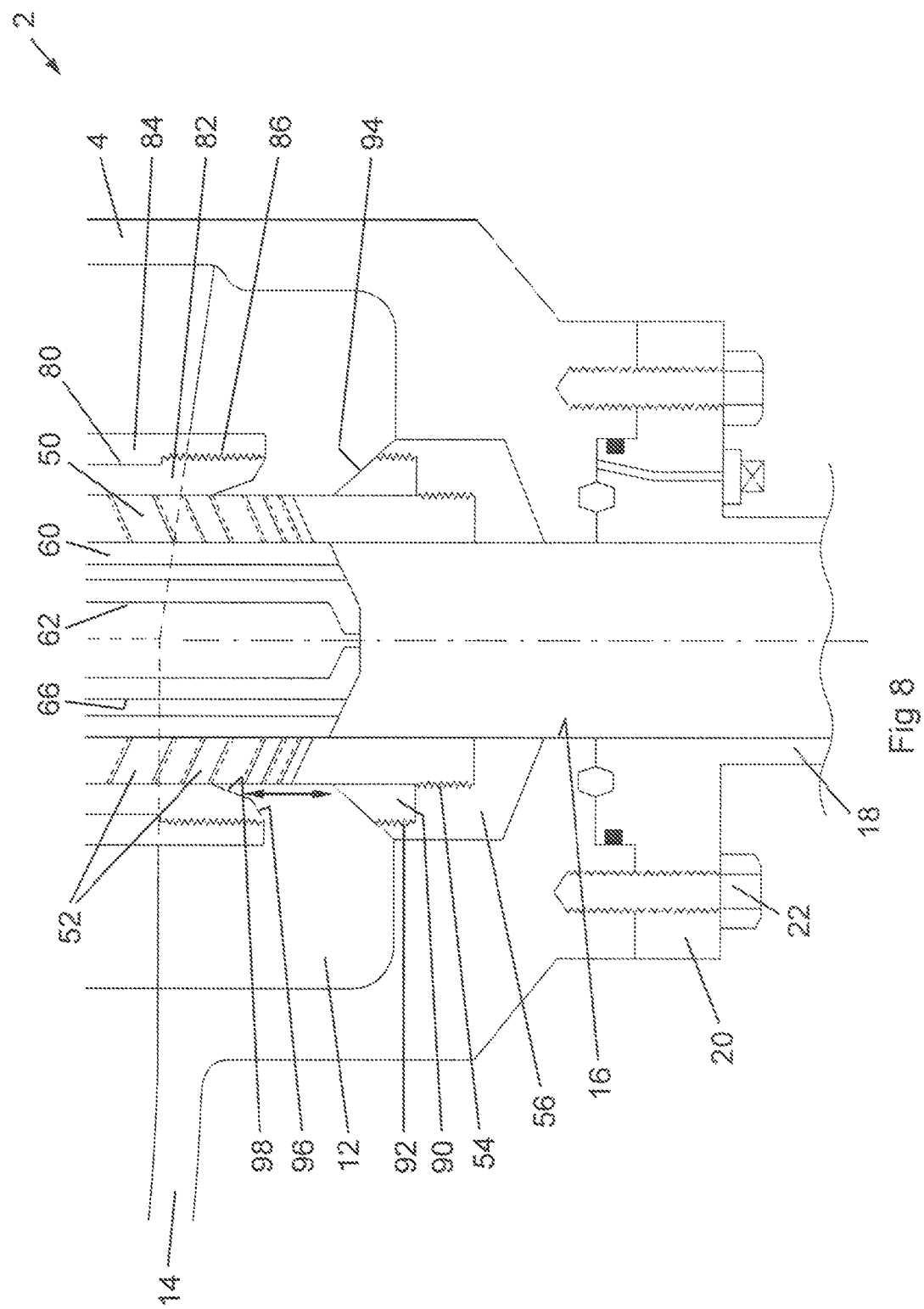

VALVE ASSEMBLY

CROSS REFERENCE TO RELATED APPLICATION

This application claims priority to and benefit of Great Britain Application No. GB1423201.1, entitled "VALVE ASSEMBLY", filed Dec. 24, 2014, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The present invention relates to a valve assembly, in particular to a valve assembly in which fluid pressure across the valve is required to be equalized before the position of the valve is changed, such as a gate valve or a ball valve. The valve assembly of the present invention finds particular use in wellhead assemblies and the control of fluids produced from subterranean wells, in particular in subsea locations.

Valves of differing designs and operating principles are also known. For example gate valves and ball valves are known. These forms of valve are known for use in controlling fluid flow and are generally operated between a fully open position and a fully closed position, as fluid flow is required. They offer some ability to control the flow of fluid between the fully open flowrate and zero flow achieved with the valve in the fully closed position. However, they are generally only used at relatively low pressures. Gate valves and ball valves are generally only used where no significant pressure differential exists between the fluid upstream and downstream of the valve. An alternative form of valve is the butterfly valve, generally also operated in a fully open or fully closed position, to control fluid flow. As butterfly valves are generally efficient only at low pressures, they are seldom used in wellhead installations, where a valve must be able to cope with being exposed to fluid at full wellhead pressure.

Check valves are used to allow fluid flow in a given direction, typically once a predetermined threshold pressure has been achieved and the valve is 'cracked', but to prevent the flow of fluids in the reverse direction. Various designs of check valve are known and operated, including ball check valves, diaphragm check valves and swing check valves.

Valves, such as gate valves and ball valves, are generally used in situations where the fluid pressure upstream of the valve is generally the same as the fluid pressure downstream of the valve, as noted above. In use, when changing the position of the valve, for example when closing an open valve or opening a closed valve, it is necessary to equalize the pressure of fluid on the upstream and downstream sides of the valve. Conventional valve designs do not generally provide for the pressure to be equalized in this manner without movement of the valve itself.

There is a need for an improved valve assembly, in particular for use in the control of fluids produced from a subterranean well, for example in a wellhead assembly.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 3 is a diagrammatical cross-sectional view of the lower housing of the pressure equalizing valve assembly along the line III-III of FIG. 2;

FIGS. 4a, 4b, 4c and 4d are diagrammatical cross-sectional views of the channel in the inner wall of the lower housing of the pressure equalizing valve assembly of FIG. 2, at the positions A, B, C and D respectively of FIG. 3;

FIG. 6 is a cross-sectional view of a portion of the flow control assembly of FIG. 1 in the fully closed position;

FIG. 7 is an enlarged cross-sectional view of the seating arrangement of the flow control assembly shown in FIG. 6;

FIG. 8 is a cross-sectional view as in FIG. 6, but with the flow control assembly in a position intermediate between the fully closed position and the fully open position;

DETAILED DESCRIPTION OF SPECIFIC EMBODIMENTS

Figure 1:
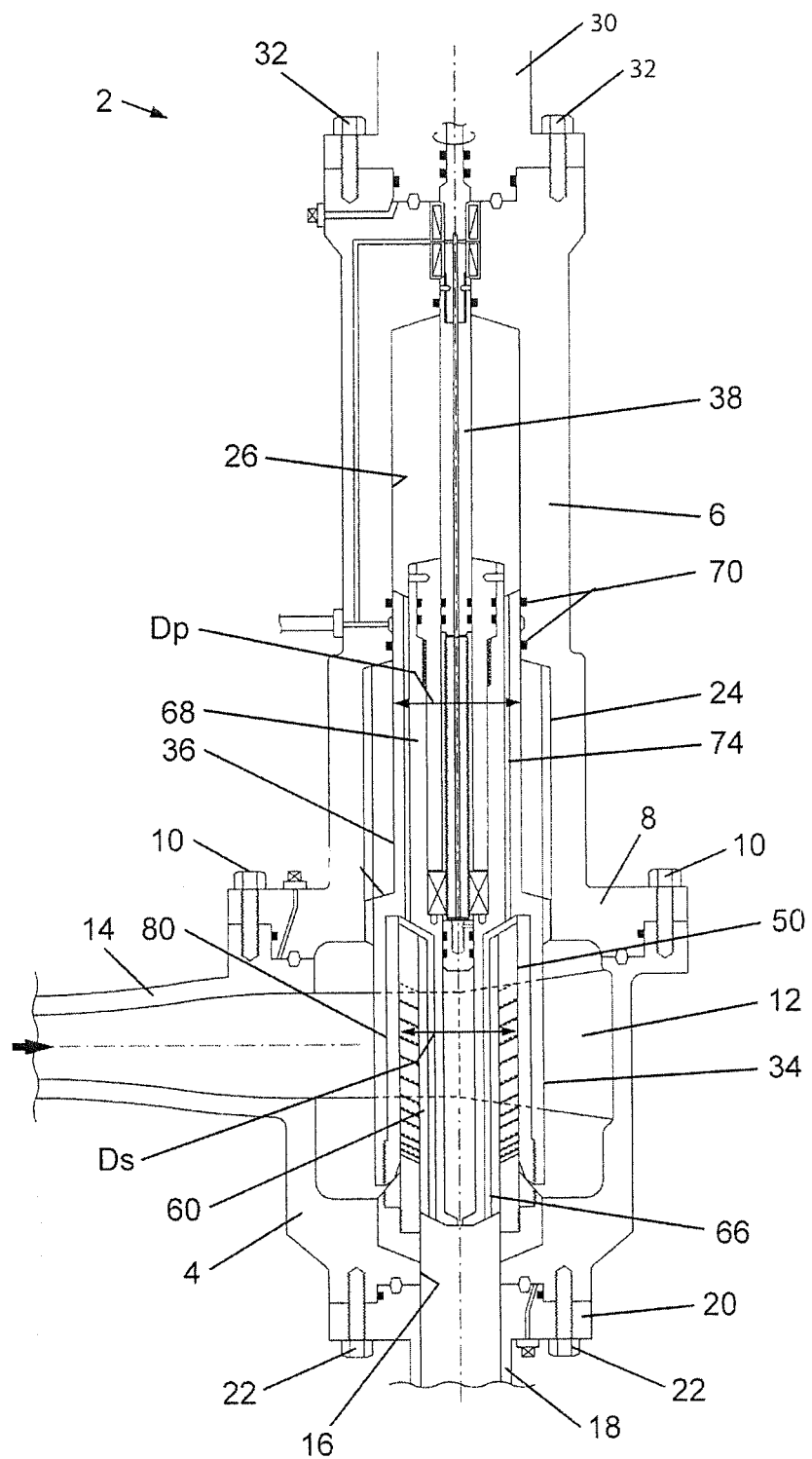
FIG. 1 is a cross-sectional view of an embodiment of a pressure equalizing valve assembly for use in the valve assembly of the present invention.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Fluids are produced from subterranean wells at high pressures. Fluids, such as gas and oil, together with fluids introduced into the well during drilling and completion operations, such as water and muds, can be produced from the well at pressures up to 10,000 psi and higher. Accordingly, the control of fluids produced from a well represents a significant task for a valve assembly, which must be able to operate in a very harsh environment.

It would be most advantageous if a valve assembly could be provided which may be used to control both the pressure of a fluid stream or the flowrate of the fluid stream, depending upon the operational requirements of the valve. In addition, it would be most useful if the valve assembly could offer a reliable shut-off capability, that is reduce fluid flow through the valve to zero without fluid leakage past the valve or a risk of failure of the valve. For a wellhead application, the valve assembly must be able to equalize the fluid pressure difference across the valve at high fluid pressures, for example a pressure drop across the valve of 3,000 psi or higher.

The present invention provides an improved design of valve for the control of fluid flow. The valve assembly of the present invention finds particular use in the control of fluids produced from subterranean wells, especially use in a wellhead assembly. The reliability of the valve assembly is such that it may be used in wellhead assemblies in remote and/or hard to reach locations, such as wellhead installations on the seabed.

In a first aspect, the present invention provides a valve assembly comprising:

a main valve having a valve member moveable between a closed position and an open position, in use the main valve having an upstream side and a downstream side;

a pressure equalizing assembly for equalizing the fluid pressure across the main valve, the pressure equalizing assembly comprising a line extending from the upstream side of the main valve to the downstream side of the main valve and a pressure equalizing valve assembly;

wherein the pressure equalizing valve assembly comprises:

a valve housing;

a first port for fluid to enter or leave the valve housing;

a second port for fluid to leave or enter the valve housing;

a flow control assembly disposed within the valve housing between the first and second ports, whereby fluid entering the valve housing is caused to flow through the flow control assembly, the flow control assembly comprising:

a cage having apertures therethrough to provide passage for fluid passing from the inlet to the outlet; and a closure assembly having a closure member moveable with respect to the cage between a first closed position, in which the closure member closes the apertures in the cage, and a second open position, in which the apertures in the cage are open.

The valve assembly comprises a main valve. The main valve is a valve which, in use, requires that pressure across the valve is equalized before the position of the valve is changed, in particular when the valve is moved from one of the open and the closed position to the other. Such main valves are known in the art and are commercially available and include ball valves, butterfly valves and gate valves. In general, the valve may be any valve that requires pressure equalization before the valve position is changed.

In use, the aforementioned main valves have an upstream side and a downstream side. In many cases, the main valve is required to be oriented specifically with respect to the direction of fluid flow through the valve. The assembly of the present invention employs such valves and provides an improved means for equalizing the pressure between the upstream side of the main valve and the downstream side of the main valve.

The valve assembly of the present invention comprises a line extending between the upstream side of the main valve and the downstream side of the main valve. Preferably, the line extends between the upstream and downstream sides exterior to the valve. In particular, the line has one end opening at the upstream side of the main valve and a second end at the downstream side of the main valve, such that fluid may flow from the upstream side of the main valve through the line to the downstream side of the main valve. In practice, the line provides a bypass around the main valve for fluid to flow around the main valve. However, in use, the line is used to equalize pressure on both sides of the main valve, prior to the position of the main valve being changed.

The valve assembly of the present invention further comprises a pressure equalizing valve assembly in the aforementioned line. In use, the pressure equalizing valve assembly is operated to allow the flow of fluid around the main valve. The principle of the present invention relies upon the pressure equalizing valve being one that can be operated, in particular opened, closed and used to control the flow of fluid through the pressure equalizing valve, under conditions of a high differential fluid pressure across the pressure equalizing valve, in contrast to the main valve. The present invention may employ any form of valve assembly as the pressure equalizing valve, provided it is able to operate under a high fluid pressure differential between the upstream side and downstream side of the main valve.

The preferred aspect of the present invention employs a particular form of flow valve assembly as the pressure equalizing valve, that is a valve assembly comprising a cage having apertures through which fluid is allowed to flow and a closure member to selectively open and close the apertures, thereby controlling the flow of fluid therethrough.

The preferred pressure equalizing valve assembly comprises a housing having a first port for fluid and a second port for fluid, with a flow control assembly disposed within the housing between the fluid ports. As will be described hereinafter, the assembly may be oriented such that fluid enters one of the fluid ports and leaves through the other fluid port, depending upon the embodiment of the present invention. In one preferred arrangement, the pressure equalizing valve assembly is arranged whereby all the fluid entering the housing through one of the ports is caused to flow through the flow control assembly to leave the housing through the other port.

In one embodiment, the first port is in fluid flow connection with the outside of the cage, such that fluid entering the housing through the first port is provided to the exterior of the cage and flows through the apertures of the wall of the cage to the interior thereof. The second port is in fluid flow connection with the interior of the cage, such that fluid entering the housing through the second port is provided to the interior of the cage and flows through the apertures in the wall of the cage to the outside of the cage.

In a preferred arrangement, the housing comprises a cavity therein connected to the first port, the flow control assembly being disposed within the cavity, preferably centrally, such that the cavity extends around the flow control assembly. In this way, fluid entering through the first port in the housing is caused to flow around the flow control assembly and enter the cage evenly from the cavity. In a preferred arrangement, to assist the even distribution of fluid within the cavity, the first port is arranged in the housing to extend tangentially to the walls of the cavity. It has been found that such an arrangement having a tangential entry provides an improved fluid control when using the closure member/cage arrangement of the valve assembly of the present invention. In particular, by directing incoming fluid into the cavity at an angle, the direct impact of the fluid onto the portion of the flow control assembly facing the inlet is avoided. This prevents premature wear and failure of the flow control assembly, in particular in the case of an erosive fluid stream, such as one containing entrained solid particles, such as may be produced from a subterranean well from time to time. In addition, by having the fluid stream directed in the cavity around the flow control assembly, a more even flow of fluid through the flow control assembly is obtained, in turn improving the control of the fluid flowrate and/or pressure.

In a particularly preferred arrangement, the first port has the form of an opening in the wall of the cavity, disposed to direct fluid into a channel or groove having the form of an involute and extending around the outer wall of the cavity. The channel or groove is preferably formed to have a progressively smaller cross-sectional area, in order to progressively introduce fluid into the cavity around the flow control assembly. In this way, an even distribution of fluid around the flow control assembly is obtained.

As noted, the pressure equalizing valve assembly comprises a first port and a second port for fluid to enter and leave the valve housing. Between the ports is disposed a flow control assembly, operable to control the flow rate and/or pressure of fluid passing through the pressure equalizing valve assembly. The flow control assembly comprises a cage having apertures therethrough, through which fluid is caused to flow. The apertures are opened and closed as described hereafter. The control of the flow of fluid is obtained by selecting the number and/or size of apertures that are open for fluid passage. The cage may have any suitable form, but is preferably in the form of a generally cylindrical tube, with apertures extending through the wall of the tube.

The arrangement of the cage is such that the outside of the cage is in fluid connection with the first port and the interior of the cage is in fluid connection with the second port. In this way, in embodiments in which the first port is acting as the fluid inlet, fluid enters the housing through the first port, flows through the apertures into the cage interior and leaves the housing through the second port. In embodiments in which the second port is acting as the fluid inlet, fluid enters the housing through the second port, flows into the interior of the cage, passes through the apertures in the cage wall and leaves the housing through the first port.

The apertures may extend through the wall of the cage and be arranged around the cage in any suitable pattern. Known patterns for the apertures include overlapping rows of apertures of different sizes. In one preferred arrangement, the apertures are arranged in a plurality of rows, each row containing one or more apertures, with adjacent rows being separated by a land or region having no apertures therethrough. This arrangement improves the accuracy of the control of fluid flow, by allowing a closure member, such as a plug or sleeve, to lie with its end face extending across the land, thereby leaving the apertures either fully open or fully closed, depending upon their position relative to the closure member. In addition, the option of having the end face of the closure member in a position where it does not extend across a partially open aperture allows the end face of the closure member to be protected from the stream of fluid passing through the aperture. In known arrangement, it is frequently the case that the end faces of closure members, such as plugs or sleeves, are eroded by the streams or jets of fluid formed as the fluid passes through the apertures in the cage. These streams or jets can quickly erode the plug or sleeve, in particular eroding the surface of the plug or sleeve that contacts the seat in the fully closed position. This in turn reduces the ability of the plug or sleeve to form a complete seal to prevent fluid flow when fully closed.

As noted, the apertures in the cage are preferably arranged in rows. The arrangement and relationship of apertures in adjacent rows may be any suitable or preferred pattern. However, in one preferred arrangement, the centers of the apertures in adjacent rows of the cage are offset from each other circumferentially around the exterior surface of the cage. In a particularly preferred arrangement, the apertures are arranged such that adjacent apertures in adjacent rows extend in a helical pattern along and around the cage. This is a particularly preferred arrangement when the apertures are angled in the aforementioned preferred manner. This arrangement is of particular advantage when the assembly is being used to process fluid streams produced from subterranean wells, in particular fluid streams comprising a plurality of liquid phases, especially oil and water, and a gas phase.

The apertures may extend through the cage in any suitable direction. In known arrangements, the apertures extend radially inwards through the cage wall. In one preferred arrangement, the apertures extend inwards, in a plane perpendicular to the longitudinal axis of the cage, but at an angle to the radial direction, in order to direct the fluid entering the cage in a circular flow pattern within the cage cavity. In a particularly preferred arrangement, the apertures extend through the cage wall and open tangentially to the inner surface of the wall. In a further preferred arrangement, the apertures extend through the cage wall at an angle to the plane perpendicular to the longitudinal axis of the cage and at an angle to the radial direction. In particular, the apertures extend at an angle to the plane perpendicular to the longitudinal axis in either the upstream direction or downstream direction of fluid within the cage. In this way, the fluid is caused to flow in a helical flow pattern within the cage. In particular, the apertures may be angled to avoid the fluid stream from one aperture contacting the fluid stream from an adjacent aperture.

The flow control assembly comprises means to open and close the apertures extending through the cage, in order to control the flow of fluid through the valve assembly. In particular, the flow control assembly comprises a closure assembly having a closure member. The closure member is moveable with respect to the cage, so as to open and close the apertures in the cage wall, thereby varying the cross-sectional area of the apertures available for the flow of fluid through the wall of the cage.

The closure member may be disposed within the cage and is moveable with respect to the cage and the apertures extending through the wall of the cage. In this arrangement, the closure member acts to open or close the apertures by closing and sealing the inner end of each aperture. The closure member is moveable between a first position, in which it obscures and closes all the apertures in the cage, and a second position, in which it overlies and obscures none of the apertures in the cage. The closure member may be positioned between the first and second positions, such that a portion of the apertures are open for the passage of fluid therethrough, and the remainder of the apertures are closed to the flow of fluid. The flow of fluid through the valve assembly may thus be controlled by the appropriate position of the closure member within the cage.

The closure member within the cage may have any suitable form. For example, in the case of a generally cylindrical tubular cage, the closure member may be a cylindrical sleeve or a cylindrical plug, the outer diameter of which corresponds to the inner diameter of the cage.

Alternatively, the closure member may be disposed outside the cage and is moveable with respect to the cage and the apertures extending through the wall of the cage. In this arrangement, the closure member acts to open or close the apertures by closing and sealing the outer end of each aperture. The closure member is moveable between a first position, in which it obscures and closes all the apertures in the cage, and a second position, in which it overlies and obscures none of the apertures in the cage. The closure member may be positioned between the first and second positions outside the cage, such that a portion of the apertures are open for the passage of fluid therethrough, and the remainder of the apertures are closed to the flow of fluid. The flow of fluid through the valve assembly may thus be controlled by the appropriate position of the closure member outside the cage.

The closure member outside the cage may have any suitable form. For example, in the case of a generally cylindrical tubular cage, the closure member may be a cylindrical sleeve, the inner diameter of which corresponds to the outer diameter of the cage.

In one preferred embodiment, the pressure equalizing valve assembly comprises a first closure member disposed within the cage, as described above, and a second closure member disposed outside the cage, as described above. The first and second closure members may be moved independently from one another, relative to the cage. In this case, the pressure equalizing valve assembly will further comprise an actuator assembly for each of the first and second closure members. In a preferred arrangement, the first and second closure members are moved together, preferably by being connected to one another, by a single actuator assembly. This arrangement offers certain advantages, as described hereinafter.

Both the first and second closure members may be used to control the flow of fluid through the pressure equalizing valve assembly. In one arrangement, the first and second closure members are sized relative to one another and the cage that, when moved together, at a given position of the closure assembly, the first and second closure members are closing the same apertures through the cage wall and leaving the same apertures open for fluid flow. In other words, a given aperture will either be open at both its inner and outer ends or will be closed at both its inner and outer ends.

In a preferred arrangement, the first and second closure members are sized and arranged differently with respect to one another and the cage, such that in a given position of the closure assembly, the first and second closure members are obscuring and closing a different number of apertures. In particular, one of the first or second closure members is arranged such that, as the closure members are moved from the first, closed position, the said one closure member begins to open the respective ends apertures in the cage wall, while the other ends of the same apertures remain closed. In this way, the said one closure member acts as a shut-off member, responsible for shutting off the flow of fluid through the valve assembly, while the other closure member is acting to control the flow of the fluid through the apertures in the cage. While the respective ends of apertures will be opened as the said one closure member moves from the first, closed position towards the second, open position, fluid will not flow through the apertures in the cage wall until the other of the two closure members has moved sufficiently to open the apertures to fluid flow. In this way, the other closure member acts as the flow control member, the position of which is responsible for determining the flow of fluid through the cage and the valve assembly. Preferably, the member acting as the shut-off member is the second closure member, disposed outside the cage, while the flow control member is the first closure member disposed within the cage.

In a particularly preferred arrangement, as noted hereinbefore, the cage is a generally cylindrical tube. The first closure member is a plug or sleeve extending and moveable longitudinally within the tubular cage, while the second closure member is a sleeve extending and moveable longitudinally outside the tubular cage. In the preferred arrangement, the second or outer closure member is the shut-off member and the first or inner closure member is the flow control member. The respective roles of the two closure members may be achieved by having the first closure member longer than the second closure member. In this way, as the two closure members are moved longitudinally together from the first, closed position towards the second, open position, the second closure member progressively reveals the outer ends of the apertures in the cage. Once the outer ends of the apertures are revealed, further longitudinal movement of the first closure member within the cage is required to open the inner ends of the same apertures and allow fluid flow to occur. The flow rate of fluid through the cage and the valve assembly as a whole is thus controlled by the longitudinal position of the first closure member within the cage, and not the longitudinal position of the second closure member outside the cage.

As noted hereinbefore, the first and second closure members may be moveable independently of one another. However, a preferred closure assembly is one in which the first and second closure members are moveable together, more preferably by being connected. In one preferred arrangement, the first and second closure members extend from a single support member, such that movement of the support member causes corresponding movement of both the first and second closure members. Preferably, the support member is in the form of a piston moveable within a chamber.

The closure assembly of the pressure equalizing valve assembly is moved by means of an actuator. Actuator systems suitable for use in the pressure equalizing valve assembly of the present invention are known in the art and include a range of reciprocating actuator systems. The actuator system may be operated electrically or hydraulically or by a combination of the two. Again, such systems are known in the art.

The closure assembly may be connected to the actuator system by a shaft. This is particularly advantageous as it allows the actuator module itself to be mounted on the exterior of the valve assembly, so that it may be serviced and or removed without requiring the entire pressure equalizing valve assembly to be disassembled. Such an arrangement is also known in the art. The actuator may be arranged to move the shaft longitudinally, such that the shaft reciprocates, together with the respective closure members. Such an arrangement is well known in the art and suitable reciprocating actuator assemblies are commercially available. In a particularly preferred arrangement, the closure members are moved by one or more shafts that transfer drive from the actuator system to the closure assembly by rotation of the shaft or shafts, as opposed to the conventional reciprocating motion. In the preferred embodiment, with the first and second closure members extending from a single support member, a single shaft is required to move the support member and the two closure members. The shaft may be connected to the support member in any suitable way to translate rotational movement of the shaft into longitudinal movement of the closure members with respect to the tubular cage. A particularly suitable means for transferring the drive is to provide a portion of the length of the shaft with a thread that engages a ball screw nut held captive in the support member.

As noted hereinbefore, in one embodiment, one of the first and second closure members acts as a shut-off member, that is to close the pressure equalizing valve assembly and prevent the flow of fluid therethrough. As also noted, a preferred arrangement is to have the second closure member, disposed outside the cage, as the shut-off member. In order to effectively close the pressure equalizing valve assembly to the flow of fluid, the relevant member is provided with a seat which is engaged by a sealing surface of the member when in the first or closed position. Accordingly, in the preferred arrangement, the second member is provided with a seat extending around the cage, which is engaged by a sealing surface of the second member when in the first or closed position.

Seat arrangements for use with the shut-off closure member are known in the art. However, it has been found that the seat of the pressure equalizing valve assembly can suffer significant wear, in particular due to erosion by fluid flowing past and over the seat as it enters the apertures in the cage. The erosion of the seat is particularly acute when the fluid stream has solid particles entrained therein. Similar significant wear of the sealing surface of the closure member can also take place. Accordingly, it is preferred that the seat is disposed in a position that is displaced from the apertures in the cage, whereby the seat is out of the direct flow path of fluid passing through the apertures and entering the cage.

It is preferred to employ a seating assembly that is self-sharpening. That is, the action of the closure member moving into and out of engagement with the seat itself wears both the seat and the sealing surface of the closure member in a predetermined pattern that removes damage to the seat and the sealing surface of the closure member. The closure member is preferably formed of a hard material, relative to the seat, which is of a softer material. In this way, the action of the closure member contacting the seat wears the surface of the seat, to remove any pits and the like formed as a result of damage caused to the seat by action of the fluid and/or any entrained solids.

The surface of the seat preferably extends at an acute angle to the longitudinal axis of the closure member and the cage, whereby solid particles that fall onto or come to rest on the surface of the seat are caused to move off the seat, for example under the action of gravity. In this way, the seat may be kept relatively clean of debris, limiting damage to the sealing surfaces of the seat and the closure member and improving the fluid seal between the seat and the closure member.

A seat may be provided to be contacted by each of the closure members, with each closure member having a respective seat disposed to be contacted by a sealing surface of the closure member when the closure member is in the first, closed position. More preferably, a seat is provided for one of the first or second closure members only.

In one arrangement, the seat is formed within the cage, to be contacted by a sealing surface of the first closure member. For example, the seat may be formed as a shoulder within the cage member, with which the first closure member is brought into contact, when moving into the first, closed position. In such a case, the seat is preferably formed as an angled shoulder within the cage, such that solid debris on the cage is directed inwards towards the center of the cage member.

The seat is preferably formed outside the cage, so as to be contacted by the second member. As noted above, one preferred arrangement for the closure assembly of the valve assembly of the present invention comprises a generally cylindrical tubular cage, with a second closure member in the form of a cylindrical sleeve extending around the outer surface of the cage. The seat arrangement for the second enclosure member, disposed outside, that is on the upstream side of the cage member, is preferably formed and interacts with the second closure member in manner that allows the fluid pressure on the inlet side of the cage to bear against the second closure member and force the sealing portion of the second closure member into contact with the sealing surface of the seat. In this way, the fluid seal between the second closure member and the seat is assisted by the inlet fluid pressure, when the first port is acting as the fluid inlet.

Further or in addition to the aforementioned use of the inlet fluid pressure to urge the second closure member against the sealing surface of the seat, the seat and the second closure member may be arranged such that, when in contact, stresses are developed in the closure member to urge the seat and closure member into contact. In particular, the seat and the second closure member may be arranged to generate an outward hoop force on the sleeve as the closure member is forced into contact with the seat by the actuator. This in turn improves the sealing efficiency of the sleeve against the surface of the seat.

One preferred design of seat assembly for the second closure member comprises a seat having a sealing surface extending at an angle to the longitudinal axis of the cage. Most preferably, the sealing surface of the seat extends away from the cage at an acute angle to the longitudinal axis of the cage in the direction of movement of the second closure member when moving into the first, closed position. The second closure member is provided with a complimentary sealing surface, in particular on the end surface of the sleeve. The complimentary sealing surface may comprise a single surface extending at an appropriate angle so as to form a seal with the angle sealing surface of the seat, when the sleeve is in the first, closed position. In one arrangement, the sealing surface on the end surface of the sleeve extends at an acute angle to the longitudinal axis of the cage in the direction of movement of the second closure member when moving into the second open position. In this way, the sleeve is provided with a leading edge, which contacts the sealing surface of the seat.

Alternatively and more preferably, the sleeve may comprise a compound surface having at least two surface portions extending at an obtuse angle to one another. The ridge formed by the compound surfaces contacts the sealing surface of the seat and provides the seal, to prevent the flow of fluid through the cage. As the sleeve moves into and out of the first, closed position, the ridge is caused to move across the sealing surface of the seat, removing damage caused to the surface by the erosive effects of the fluid.

As described hereinbefore, the pressure equalizing valve assembly used in the valve assembly of present invention is particularly suitable for controlling the flow of fluid streams at high pressure around the main valve, in particular when the fluid streams produced by a subterranean well or the fluid streams flowing into and out of a wellhead assembly. When operating with fluid streams at high pressures, a particular problem arises with the actuation of the pressure equalizing valve assembly and the movement of the components exposed to the fluid stream. The problem arises when the valve components, such as the closure member, are being acted upon by the fluid stream, the pressure of which bears upon one or more surfaces of the components and urges them to a particular position, for example the first, closed position or the second, open position. In such a case, the actuating mechanism must move the valve components against the action of the fluid pressure. This can place significant strain on the actuating mechanism, requiring the actuator to be increased in power to cope with the additional burden. This burden increases as the operating pressure of the pressure equalizing valve assembly increases.

Accordingly, in one embodiment, it is preferred to have the closure assembly of the pressure equalizing valve assembly arranged so as to be balanced with respect to the fluid pressure within the valve. It is especially preferred to arrange the closure assembly to be balanced with respect to both fluid pressure at the first port and fluid pressure at the second port.

As noted above, the valve assembly of the present invention comprises a line extending between the upstream side of the main valve and the downstream side of the main valve. The pressure equalizing valve assembly is disposed in the line. The line may be provided with a single pressure equalizing valve assembly. In such an embodiment, the pressure equalizing valve assembly may be arranged such that the second port is connected to the upstream side of the main valve, that is the side of the main valve with the highest fluid pressure, and the first port is connected to the downstream side of the main valve, that is the side of the main valve with the lower pressure. More preferably, the pressure equalizing valve assembly is arranged to have the first port connected to the upstream or high pressure side of the main valve, while the second port is connected to the downstream or lower pressure side of the main valve.

More preferably, the line is provided with two pressure equalizing valve assemblies. In this way, the pressure equalizing valve assemblies may be arranged to accommodate a reversal of the fluid flow through the main valve and still provide efficient pressure equalization across the main valve, when in use.

In one such embodiment, the first pressure equalizing valve assembly is arranged to have its second port connected to the upstream or higher pressure side of the main valve and the second pressure equalizing valve assembly is arranged to have its second port connected to the downstream or lower pressure side of the main valve. The first ports of the first and second pressure equalizing valve assemblies are connected.

In an alternative embodiment, the first port of the first pressure equalizing valve assembly is connected to upstream side of the main valve and the first port of the second pressure equalizing valve assembly is connected to the downstream side of the main valve. In this arrangement, the second ports of the first and second pressure equalizing valve assemblies are connected together.

As indicated above, the valve assembly of the present invention finds use in any situation where a valve requires pressure equalization before the position of the valve is changed. The valve assembly finds particular use in installations for subterranean wells, for example in wellhead installations.

Accordingly, in a further aspect, the present invention provides a wellhead installation comprising a valve assembly as hereinbefore described.

The valve assemblies is particularly suitable for use in subsea installations.

Referring to FIG. 1, there is shown a pressure equalizing valve assembly, generally indicated as 2, according to a first embodiment of the present invention. The pressure equalizing valve assembly 2 comprises a generally cylindrical lower housing 4 and a generally cylindrical upper housing 6. The upper housing 6 has a flange 8 formed around its lower end portion, allowing the upper housing 6 to be mounted to the lower housing 4 by means of bolts 10 in a conventional manner.

References herein to 'upper' and 'lower' are used for the purposes of ease of identification of components in the accompanying figures and are used in relation to the orientation of the apparatus shown in the figures only, it being understood that the assemblies of the present invention may be used in any appropriate orientation and need not be limited to operation in the orientation shown in the accompanying drawings.

The lower housing 4 comprises a generally cylindrical flow chamber 12 formed therein and has a first port 14 for fluid and a second port 16 for fluid. Fluid may enter or leave the housing 4 through either of the first and second ports 14, 16, depending upon the arrangement of the pressure equalizing valve assembly. The first port 14 has a generally circular cross-section in its portion more distant from the lower housing 4, and smoothly transitions to a generally rectangular feed section in the portion adjacent the lower housing 4 and immediately before opening into the flow chamber 12. The first port 14 is arranged laterally to open in the side of the flow chamber 12, as shown in FIG. 1, while the second port 16 is arranged axially in the lower portion of the lower housing 4, as also shown in FIG. 1. Fluid may be led to or removed from the first port 14 by a conventional pipe (not shown for clarity). Similarly, fluid is led to or away from the second port 16 through a conventional pipe 18, mounted to the lower portion of the lower housing by means of a flange 20 and bolts 22, again of conventional design.

The upper housing 6 comprises a first, generally cylindrical chamber 24 therein in its lower region which opens into the flow chamber 12 in the lower housing 4. The upper housing 6 further comprises a second, generally cylindrical chamber 26 therein in its upper region. The second chamber 26 is sealed from the first chamber as described hereinafter. An actuator assembly 30, of known design and commercially available, is mounted to the upper end of the upper housing 6 by bolts 32, in conventional manner. The actuator assembly 30 may comprise any suitable form of actuator, for example a hydraulic, electro-hydraulic or electric actuator. Electric actuators are preferred.

The pressure equalizing valve assembly valve assembly 2 further comprises a flow control assembly, generally indicated as 34, disposed within the flow chamber 12 of the lower housing, the flow control assembly 34 having a closure assembly, generally indicated as 36. Components of the closure assembly 36 extend into the first chamber 24 in the upper housing 6 and into the second chamber 26 of the upper housing 6. The closure assembly 36 is sealed to the interior of the upper housing 6 at the junction between the first and second chambers 24, 26. Details of the flow control assembly and the closure assembly are described hereinafter.

A shaft 38 extends from the actuator assembly 30 and connects with the upper end of the closure assembly 36.

Figure 2:
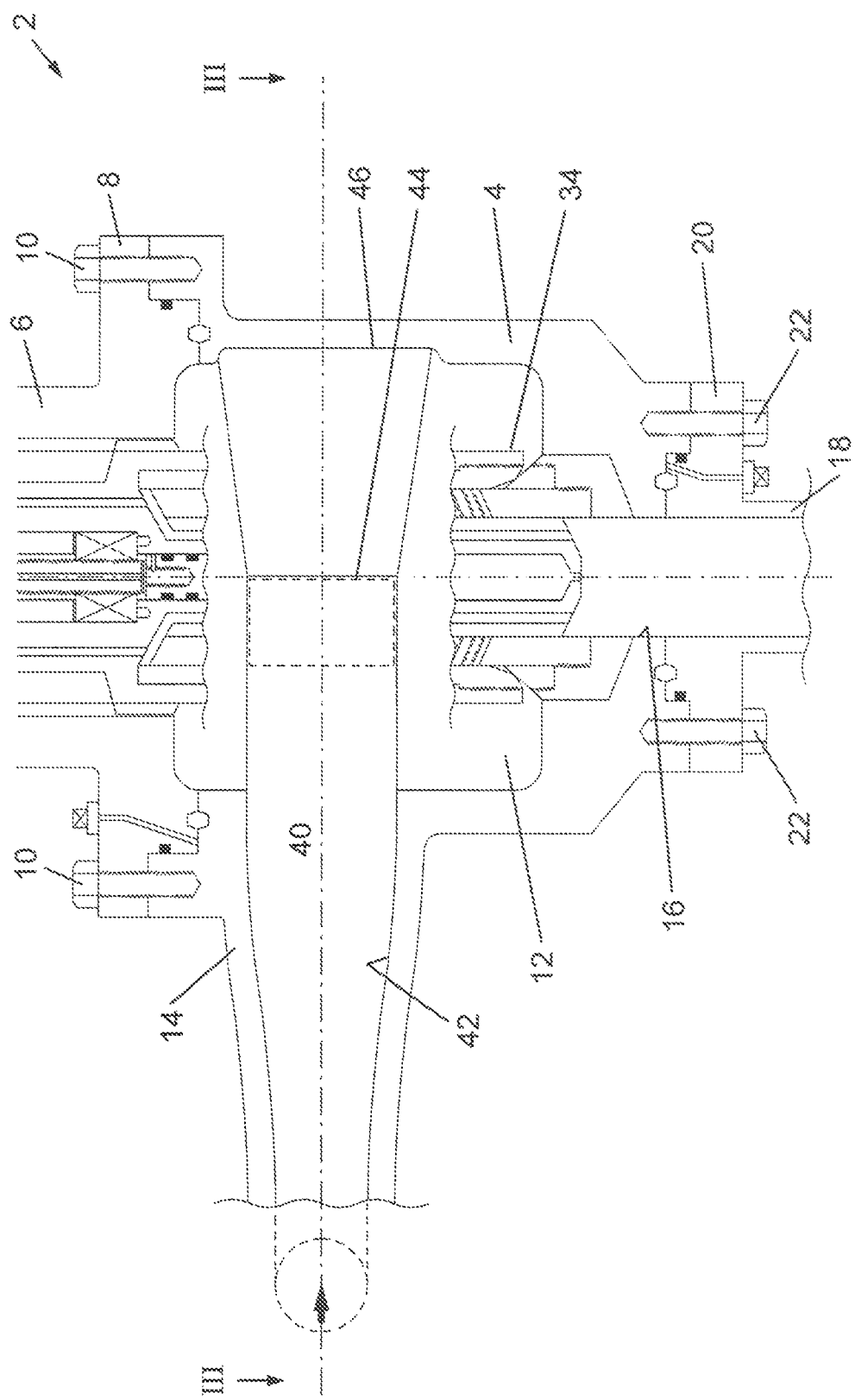
FIG. 2 is a cut-away, cross-sectional view of the lower housing of the pressure equalizing valve assembly of FIG. 1.

As noted above, the first port 14 opens into the flow chamber 12 of the lower housing 4 and is disposed in the side of the lower housing, so as to direct incoming fluid laterally into the flow chamber 12. Referring to FIG. 2, there is shown a cut-away cross-sectional view of the lower housing 4, with a portion of the flow control assembly 34 removed, to show details of the fluid inlet arrangement of the flow chamber 12. A diagrammatical cross-sectional view along the line III-III of FIG. 2 is shown in FIG. 3.

Referring to FIG. 2, the first port 14 is arranged to have a passage 40 extending tangentially into the flow chamber 12. The first port 14 is formed to provide the passage 40 with a generally circular portion 42, and a generally rectangular orifice 44, indicated by a dotted line, opening into the flow chamber 12. The passage 40 is arranged to open at the orifice 44 tangentially to the inner wall of the lower housing 12. In this way, fluid entering the flow chamber 12 through the passage 40 is caused to flow in a circular pattern within the flow chamber 12. This has the effect of distributing the fluid around the flow control assembly 34 within the flow chamber 12. This has a number of advantageous effects. First, the incoming fluid is not caused to directly impinge upon the outer surfaces of the flow control assembly 34, as is the case with known and conventional plug-and-cage choke designs. This in turn prevents damage to the flow control assembly 34 arising from the impact of entrained solid materials and particles. Second, introducing the fluid into the flow chamber 12 tangentially allows the fluid to flow in a lower shear regime that is possible with the conventional and known arrangements, in which the incoming fluid is directed orthogonally at the plug-and-cage assembly. This in turn reduces the effects to which the various phases in the fluid stream are mixed, perhaps undoing earlier separation that may have occurred in the process lines and equipment upstream of the valve assembly. Further, the circular or rotating flow pattern within the flow chamber 12 induces separation of the different phases within the fluid stream, according to the respective densities of the phases. Further, the arrangement shown in the figures ensures that the incoming fluid stream is evenly distributed within the flow chamber 12 around the flow control assembly. This in turn increases the effectiveness and efficiency of the flow control assembly in controlling the flowrate and/or pressure of the fluid stream.

The inner wall of the lower housing 4 defining the flow chamber 12 is formed with a channel 46 therein. The channel 46 is aligned with the orifice 44 and forms an involute path for fluid entering the flow chamber 12. The channel 46 is extends circumferentially around the flow chamber 12, as shown in FIG. 3. The channel 46 decreases in cross-sectional area, travelling in the circumferential direction away from the orifice 44, that is the path followed by an incoming fluid stream. In this way, when fluid enters the housing through the first port 14, the fluid stream is encouraged gradually to enter the central region of the flow chamber 12 and flow towards the centrally located flow control assembly 34.

Details of the cross section of the channel 46 are shown in FIGS. 4a, 4b, 4c and 4d at the positions A, B, C and D of FIG. 3, respectively. As can be seen, the cross-sectional area of the channel 46 decreases in the direction of fluid flow circumferentially away from the inlet orifice 44. This reduction in cross-sectional area of the channel 46 ensures that fluid leaves the channel as it travel circumferentially around the flow chamber 12, as noted above. This reduction in cross-sectional area is achieved in the embodiment shown in FIGS. 2 and 3 by having the depth of the channel 46 decrease in the direction extending circumferentially away from the orifice 44. However, in the embodiment shown, this reduction in depth is accompanied by an increase in the width of the channel in the longitudinal direction of the lower housing 12. This increase in width has the effect of distributing the fluid stream longitudinally within the flow chamber 12. This in turn ensures that the flow control assembly has an even exposure to the fluid stream to be controlled. The reduction in cross-sectional area of the channel 46 is preferably gradual or progressive, as shown in FIGS. 2 and 3. In the embodiment shown, the cross-sectional area reduces by 25% for each 90° of turn of the fluid stream. Thus, if the cross-sectional area of the orifice 44, as shown in FIG. 4a is A, the cross-sectional area of the channel at the positions shown in FIGS. 4b, 4c and 4d is 0.75 A, 0.5 A and 0.25 A, respectively.

Figure 5:
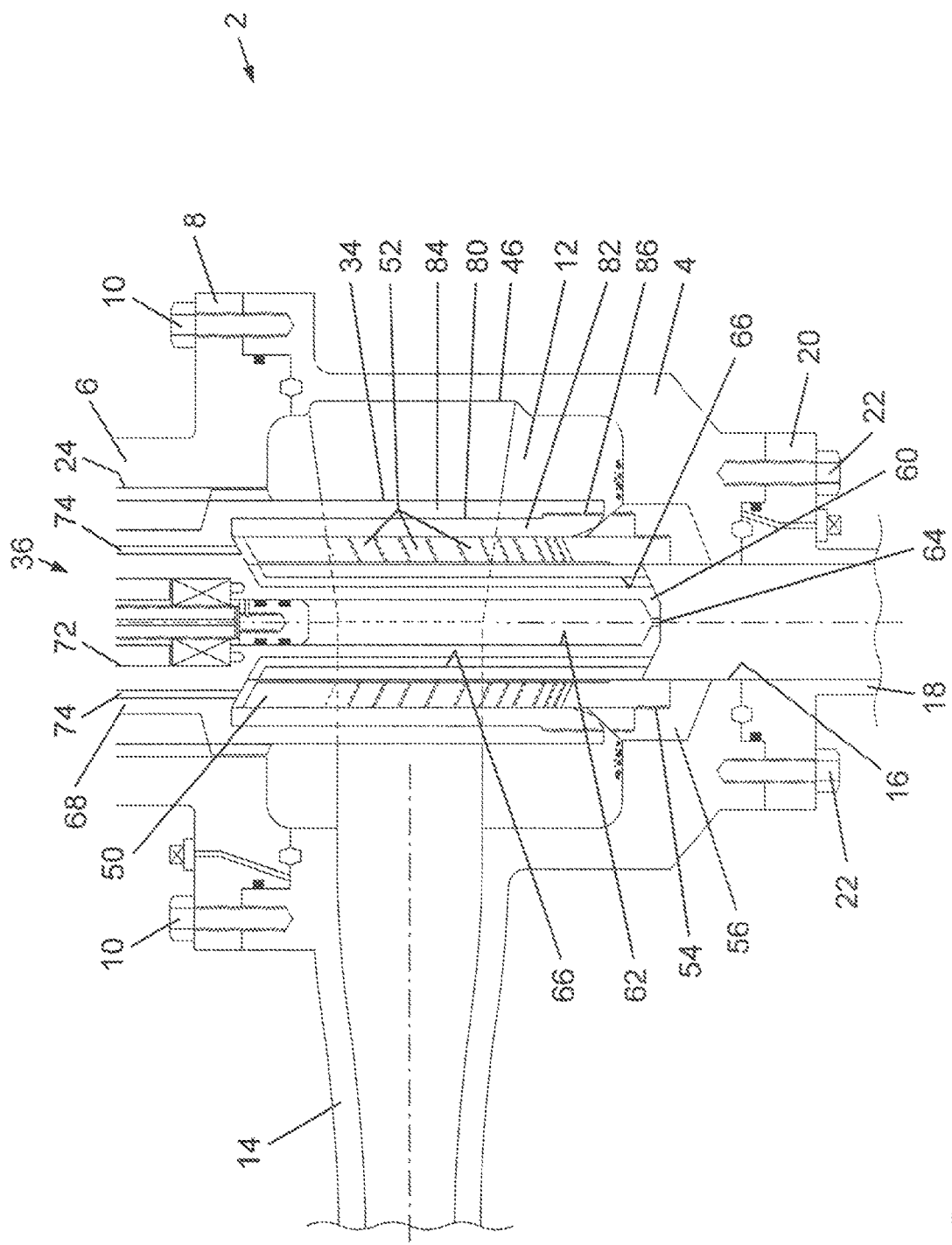
FIG. 5 is a cross-sectional view of the lower housing of the pressure equalizing valve assembly of FIG. 1, showing the flow control assembly therein.

Referring to FIG. 5, there is shown a vertical cross-sectional view of the lower housing 4 of the pressure equalizing valve assembly 2 of FIG. 1, showing the flow control assembly 34. The flow control assembly 34 comprises a cage 50 formed as a generally cylindrical tube extending longitudinally within the flow chamber 12. The cage 50 has a plurality of apertures 52 extending therethrough. In the embodiment shown, the apertures 52 extend through the wall of the cage 50 at an angle to the longitudinal axis, that is in a downwards direction, as viewed in the figures. In addition, the apertures 52 extend through the cage wall at an angle to the radial direction, so as to open tangentially to the inner surface of the cage.

The cage 50 has its lower end portion formed with a thread 54 on its outer surface. The cage 50 is mounted within the flow chamber 12 by being screwed into a threaded boss 56 inserted into the lower end wall of the lower housing 12 adjacent the second port 16. The interior of the cage 50 is in fluid flow communication with the second port 16 by means of a bore formed in the boss 56, such that fluid flowing through the apertures 52 in the cage 50 and entering the interior of the cage 50 may leave the valve assembly through the second port 16.

The flow control assembly 34 further comprises a closure assembly 36. The closure assembly 36 comprises a plug 60 extending within the central bore of the cage 50. The plug 60 is machined to be a close fit with the inner walls of the cage 50 and is slideable longitudinally within the cage 50, as will be described hereinafter. The plug 60 is generally cylindrical, having a longitudinal bore 62 formed therein. The bore 62 is open to the interior of the cage 50 by virtue of a small diameter bore 64 formed in the end of the plug 60. In this way, fluid within the bore 62 is able to leave the plug 60, thus preventing a hydraulic lock occurring.

A plurality of balancing bores 66 extending longitudinally through the plug 60. Each balancing bore 66 opens into the interior of the cage 50. The balancing bores 66 are features of the fluid balancing system in the valve assembly.

The plug 60 is shown in the fully closed position in FIGS. 1 and 5, that is the plug 60 extends within the cage 50 and covers or obscures the inner ends of all the apertures 52 in the cage 50. It will be noted that the lower or free end of the plug 60 extends within the boss 56, that is a significant distance past the lowest apertures 52 in the cage 50.

The plug 60 depends at its upper end from the lower end of a generally cylindrical piston 68. The piston 68 extends upwards from the top of the cage 50, through the first chamber 24 in the upper housing 6 and into the second chamber 26, as shown in FIG. 1. The non-rotatable piston 68 engages with grooves in the wall of the first chamber 24 and is moveable longitudinally within the upper housing 6, that is vertically as shown in FIG. 1, in association with the plug 60. Seals 70 are disposed in the inner wall of the upper housing 6 at the junction between the first chamber 24 and the second chamber 26. The seals 70, of conventional or known configuration, allow the longitudinal movement of the piston 68 within the first and second chambers, but prevent fluid from passing between the first and second chambers 24, 26. The piston 68 has a central longitudinal bore 72, communicating with the bore 62 in the plug 60 at its lower end and opening into the second chamber 26 at its upper end, to receive the shaft 38. A plurality of fluid balancing bores 74 extend longitudinally within the piston 68, the lower end of each balancing bore 74 communicating with a corresponding balancing bore 66 in the plug 60, and the upper end of each fluid balancing bore 74 opening into the second chamber 26 within the upper housing 6.

The closure assembly 36 further comprises a sleeve assembly 80. The sleeve assembly 80 is generally cylindrical and extends from the lower end of the piston 68 around and along the outer surface of the cage 50 such that the sleeve assembly 80 can obscure and cover the outer ends of the apertures 52 in the cage. The sleeve assembly 80 is formed to be a close fit around the exterior surface of the cage 50, while still allowing the sleeve assembly 80 to move longitudinally with respect to the cage 50. The sleeve assembly 80 comprises an inner sleeve 82 and an outer sleeve 84, both generally cylindrical in form. The outer sleeve 84 is unitary with the piston 68. The inner sleeve 82 extends within the outer sleeve and is retained by a threaded connection 86 at their respective lower ends. This allows the inner sleeve 82 to be formed from tungsten and the outer sleeve 84 to be formed from stainless steel.

By being attached to the piston 68, the sleeve assembly is moveable both with the piston 68 and the plug 60. In particular, the sleeve assembly 80 moves together with the plug 60 under the action of the actuator assembly 30. The control of the flow of fluid through the apertures 52 of the cage 50 is determined by the positions of the plug 60 and sleeve assembly 80 with respect to the cage. As shown in the figures, the plug 60 extends a greater distance from the end of the piston 68 than the sleeve assembly 80. This arrangement in turn provides the plug 60 and the sleeve assembly 80 with different functions. In particular, in the arrangement shown, the sleeve assembly 80 primarily acts as a flow shut-off member, that is to ensure that the flow of fluid is prevented, when the assembly is in the fully closed position, as shown in FIG. 5, for example. When the assembly has been moved from the fully closed position shown, the control of the flow of fluid through the cage 50, and hence through the entire assembly, is primarily controlled by the plug 60.

In order to perform the function of a flow shut-off member, that is prevent the flow of fluid through the assembly, the sleeve assembly 80 is provided with a sealing arrangement at its lower end, that is the end distal of the piston 68. Referring to FIG. 6, there is shown an enlarged view of a portion of the flow control assembly 34 of FIG. 1, in particular showing the lower or distal end of the sleeve assembly 80. A seating ring 90 is mounted in the boss 56 by a threaded connection 92 and extends around the cage 50. The seating ring 90 is formed from a seating material to allow a ridge on the closure member to bed in. A seating surface 94 is formed by the surfaces of the boss 56 and the seating ring 90 exposed within the flow chamber 12. As can be seen in FIG. 6, the seating surface 94 extends at an angle to the radial direction, such that it slopes away from the free end of the sleeve assembly 80. The action of the angled seating surface is twofold. First, by being angled, debris is prevented from collecting on the seating surface and stopped from preventing a fluid-tight seal being formed between the sleeve assembly 80 and the seating surface. Rather, solid particles and debris are collected in the lower region of the flow chamber 12, as viewed in FIG. 6, around the base of the cage. Second, the angle of the seating surface 94 cooperates with the surfaces on the end of the sleeve assembly 80 to be self-sharpening, as is described herein below.

The seating surface 94 cooperates with the end portion of the sleeve assembly 80. As shown in FIG. 6, the free or distal end of the outer sleeve 84 is finished perpendicular to the longitudinal axis of the sleeve assembly, plug and cage. The distal end of the inner sleeve 82 is formed with a compound surface comprising a first surface portion 96 radially outwards of a second surface portion 98. The first surface portion 96 extends at an angle to the radial direction that is more acute than the angle of the seating surface 94. The second surface portion 98 extends at an angle to the radial direction that is more obtuse than the angle of the seating surface 94. The first and second surface portions 96, 98 meet at a ridge 100. The details of the seating surface 94 and its cooperation with the surfaces at the distal end of the sleeve assembly 80 are shown in FIG. 7.

In operation, the ridge 100 is forced by the actuator assembly 30 into contact with the seating surface 94 of the seating ring 90, as the flow control assembly is moved into the fully closed position, shown in FIGS. 6 and 7. Contact between the ridge 100 and the seating surface 94 forms a fluid-tight seal. Depending upon the force exerted by the actuator assembly 30, the ridge 100 is caused to slide along the seating surface 94, due to the angle of the seating surface 94. This sliding action causes the ridge 100 and seating surface 94 to bed in, in particular to wear and removes pits, marks and blemishes in the surfaces, which may prevent a proper fluid seal from being formed. In addition, the action of the actuator assembly 30 moving the sleeve assembly 80 in the longitudinally downwards direction, as viewed in FIGS. 6 and 7, results in a force being exerted on the ridge 100 and the distal end of the sleeve assembly 80 by the seating surface 94, as indicated by arrow P in FIG. 7. This force, normal to the seating surface 94, has a radially outwards component, which induces a hoop stress in the distal end portion of the sleeve assembly 80. The action of the hoop stress is to force the ridge 100 radially outwards, against the seating surface 94, as indicated by arrows P in FIG. 7. This in turn increases the effectiveness of the seal formed between the ridge 100 and the seating surface 94. In particular, high hoop stresses can be generated, in turn causing the ridge 100 to bed into the seating surface 94.

As noted above, the plug 60 and sleeve assembly 80 extend different longitudinal distances from the piston 68 and with respect to the cage 50. The closure assembly 36 is moveable between a fully closed position, as shown in FIG. 6, for example, to a fully open position. In the fully closed position, the sleeve assembly 80 is sealed against the seating surface 94, as described above and shown in detail in FIG. 7. The plug 60 extends longitudinally within the cage 50, with its free end extending beyond the seating surface 94, as shown in FIG. 6. In the fully closed position, the plug 60 and the sleeve assembly 80 cover and obscure the inner and outer ends of the apertures 52 in the cage 50, respectively, thus preventing fluid flow through the assembly 2. With the closure assembly in the fully open position, both the inner and outer ends of all the apertures 52 in the cage 50 are uncovered and open, allowing maximum fluid flow through the assembly. With the closure assembly 36 in an intermediate position, the flow of fluid is controlled between the maximum flow and zero.

As noted, the sleeve assembly 80 has the primary function of shutting off fluid flow, by sealing against the seating surface 94, when in the fully closed position. As the actuator assembly 30 moves the closure assembly 36 longitudinally from the fully closed position, the sleeve assembly 80 is lifted from the seating surface 94, as shown in FIG. 8. The sleeve assembly 80 is moved to expose the outer ends of the apertures 52 closest to the seating surface 94. However, the plug 60, extending longitudinally further than the sleeve assembly 80, still covers the inner ends of all the apertures 52 in the cage 50. As a result, fluid does not flow. Rather, further movement of the closure assembly 36 beyond the position shown in FIG. 8 is required, such that the inner ends of apertures 52 are exposed and the respective apertures fully opened to allow fluid to flow therethrough. It will thus be appreciated that, once the closure assembly 36 is moved from the fully closed position of FIG. 6, the control of fluid flow is achieved by the position of the plug 60 with respect to the cage 50. This arrangement prevents the fluid flow causing erosion of the seat 94 and the ridge 100, regardless of the position of the sleeve assembly 80.

As noted above, the cage 50 is provided with a plurality of apertures 52 therethrough, to allow fluid to flow from the flow chamber 12 to the outlet 16. The apertures 52 may be of conventional design, form and arrangement. However, the apertures are preferably formed to lie in discrete rows, separated by lands and to extend at an angle to the radial direction and at an angle in the longitudinal direction to the perpendicular to the longitudinal axis.

Conventional designs employ circular apertures extending perpendicular to the outer surface of the cage in the radial direction, that is extend radially inwards. The apertures are nested to have the apertures in one row extend into the interstices between the apertures of each adjacent row. In this way, the sleeve or plug moving along the outer or inner surface of the cage is varying the area of exposed apertures throughout its entire movement. This has the advantage of allowing a compact cage to be formed and use a plug or sleeve having a short stroke. However, this has been found to cause a very rapid and deleterious erosion of the end surfaces and portions of the plug or sleeve.

The cage 50 comprises a plurality of apertures 52 extending through the wall of the cage, each aperture having an opening in both the inner and outer surface of the cage wall. Each aperture extends at both an angle to the radial direction and at an angle in the longitudinal direction to the normal or perpendicular, as noted above. In operation, the arrangement of the apertures causes fluid entering the cage 50 from the first port 14 to flow in a direction parallel to the inner wall and to flow in a circular pattern. This circular flow pattern prevents the incoming jets of fluid from opposing apertures from colliding within the cage. This in turn helps to maintain any separation of fluid phases that may be occurred or been induced upstream of the valve assembly and reduces the burden on fluid separation apparatus downstream of the assembly.

Further, considering the angle of the apertures in the longitudinal direction, each aperture extends at an angle to the perpendicular or radial direction longitudinally in the direction of flow. The apertures may extend at any suitable angle to the perpendicular or horizontal plane and the angle will depend upon such factors as the dimensions of the cage and valve assembly, and the nature and composition of the fluid being processed. In the arrangement shown in the figures, the apertures extend at an angle of 25° to the perpendicular or horizontal. The angle of the apertures may range from 5° to 50°, more preferably from 10° to 40°. It is preferred that the apertures are angled in the longitudinal direction sufficient to ensure that the jet of fluid entering the cage through one aperture and flowing in a circular pattern adjacent the inner wall of the cage avoids contacting the jet of fluid entering the cage through the adjacent aperture in the direction of travel of the fluid.

In operation, the arrangement of the apertures 52 induces the fluid to flow in a helical pattern within the cage in the general direction of flow within the cage 50, with the fluid being subjected to minimal shear.

The apertures 52 are arranged in discrete rows extending circumferentially around the cage, each row containing one or more apertures, more preferably at least two apertures. The rows are separated by portions of the cage wall having no apertures, or 'lands' 150. This allows the plug 60 to be positioned such that its end surface does not extend across the inner opening of one or more apertures 52. In this way, fluid entering the cage 50 through the open apertures 52 adjacent the end of the plug 60 is not caused to flow or cut across the end surface of the plug 60, in turn reducing the erosion of the plug 60 by the fluid stream. The endmost portion of the plug 60 may be provided with a taper, as shown in FIG. 7, for example, in order to improve the flow pattern of the fluid in the region adjacent the end of the plug 60.

Figure 9:
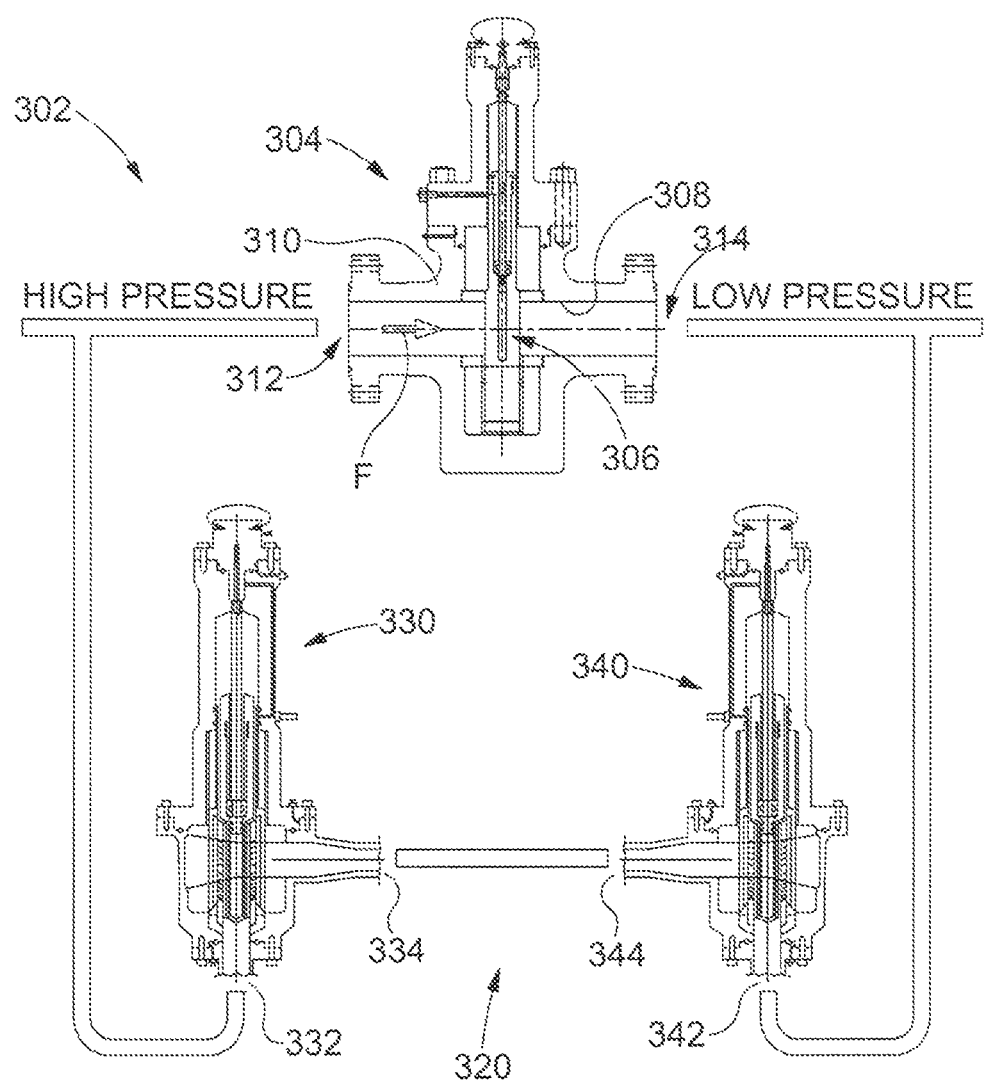
FIG. 9 is a diagram of a valve assembly of a first embodiment of the present invention.

Turning now to FIG. 9, there is shown a first embodiment of the valve assembly according to the present invention. In this assembly, generally indicated as 302, there is provided a main valve 304. The main valve shown in FIG. 9 is a gate valve. However, the main valve may be any alternative valve that requires, in use, pressure equalization across the valve, for example a ball valve. The gate valve shown in FIG. 9 is of a generally conventional arrangement in that it has a moveable valve member in the form of a gate 306 moveable within a fluid conduit 308 extending through the body 310 of the valve 304.

In operation, the main valve 304 has an upstream or high pressure side 312 and a downstream or low pressure side 314, with the flow of fluid through the valve being indicated by the arrow F.

A line 320 is provided to extend around the main valve 304 and provide a flow path for fluid around the main valve. The line 320 is provided with a first pressure equalizing valve assembly 330 and a second pressure equalizing valve assembly 340. Both the first and second pressure equalizing valve assemblies have the general configuration shown in FIGS. 1 to 8 and described hereinbefore.

The first pressure equalizing valve assembly 320 is arranged to have its second port 332 connected to the upstream side 312 of the main valve 304. Similarly, the second pressure equalizing valve assembly 340 has its second port 342 connected to the downstream side 314 of the main valve. The first port 334 of the first pressure equalizing valve assembly 330 is connected directly to the first port 344 of the second pressure equalizing valve assembly 340, as shown in FIG. 9.

In operation, when it is required to move the position of the gate 306 of the main valve 304, for example to open or close the valve, the fluid pressure across the main valve is equalized using the first and second pressure equalizing valve assemblies 330, 340. In particular, both the first and second pressure equalizing valve assemblies are opened, to allow the passage of fluid therethrough from the upstream side 312 of the main valve 304 to the downstream side 314. The first pressure equalizing valve assembly 330 may be fully opened. As the fluid fed to the second pressure equalizing valve assembly 340 enters the assembly through the first port 344 thereof, the pressure equalizing duty is performed by the second pressure equalizing valve assembly 340, which is operated to achieve pressure equalization. Once the fluid pressure on both sides of the main valve 304 is equal, the gate 306 of the main valve may be moved. Thereafter, both the first and second pressure equalizing valve assemblies 330, 340 may be closed.

Figure 10:
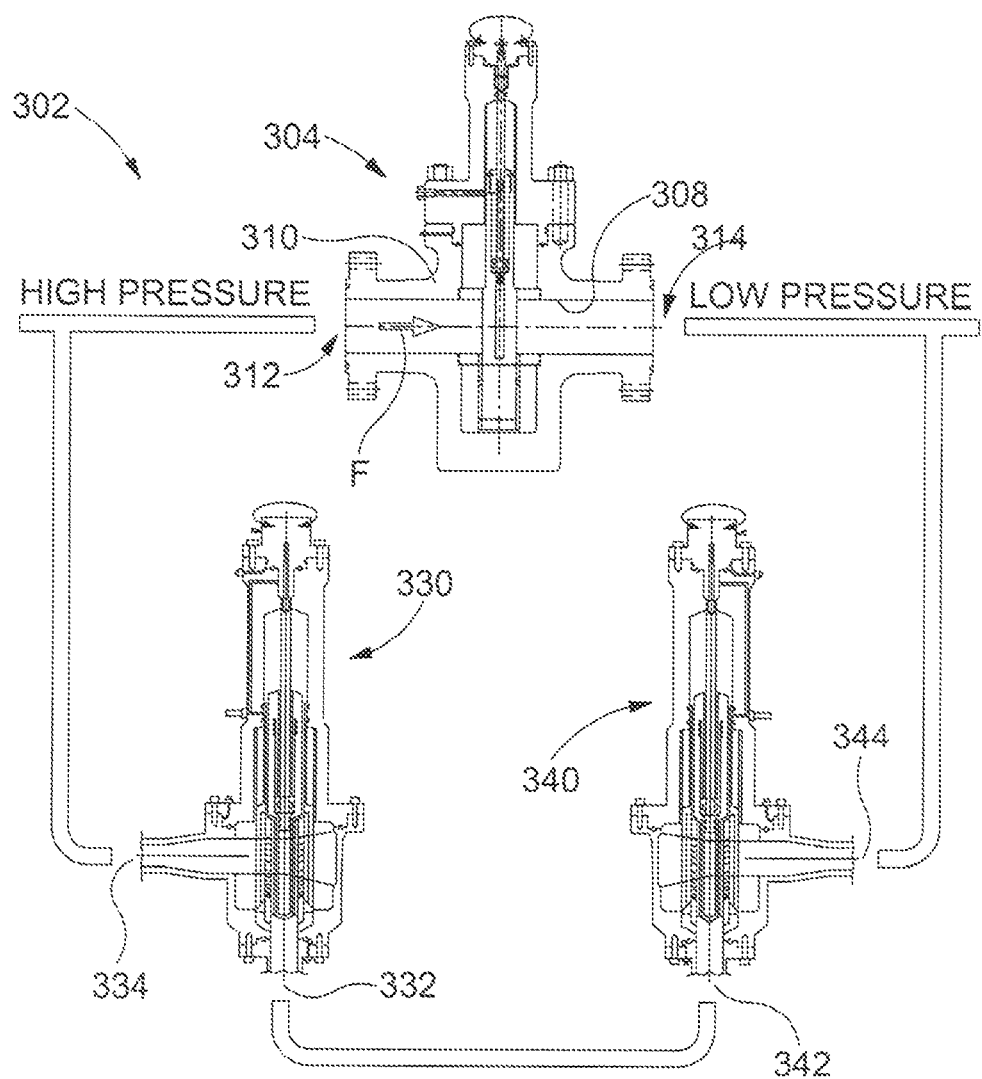
FIG. 10 is a diagram of a valve assembly of a second embodiment of the present invention.

Finally, turning to FIG. 10, there is shown a second embodiment of the valve assembly of the present invention. The valve assembly, generally indicated as 302, comprises a main valve 304, a line 320 and first and second pressure equalizing valve assemblies 330, 340, as described above and shown in FIG. 9. However, in the embodiment of FIG. 10, the first and second pressure equalizing valve assemblies 330, 340 are in the reversed orientation. In particular, the first pressure equalizing valve assembly 320 is arranged to have its first port 334 connected to the upstream side 312 of the main valve 304. Similarly, the second pressure equalizing valve assembly 340 has its first port 344 connected to the downstream side 314 of the main valve. The second port 332 of the first pressure equalizing valve assembly 330 is connected directly to the second port 342 of the second pressure equalizing valve assembly 340, as shown in FIG. 10.

In operation, when it is required to move the position of the gate 306 of the main valve 304, for example to open or close the valve, the fluid pressure across the main valve is equalized using the first and second pressure equalizing valve assemblies 330, 340. In particular, both the first and second pressure equalizing valve assemblies are opened, to allow the passage of fluid therethrough from the upstream side 312 of the main valve 304 to the downstream side 314. The second pressure equalizing valve assembly 340 may be fully opened. As the fluid fed to the first pressure equalizing valve assembly 330 enters the assembly through the first port 334 thereof, the pressure equalizing duty is performed by the first pressure equalizing valve assembly 330, which is operated to achieve pressure equalization. Once the fluid pressure on both sides of the main valve 304 is equal, the gate 306 of the main valve may be moved. Thereafter, both the first and second pressure equalizing valve assemblies 330, 340 may be closed.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A valve assembly comprising:
a main valve having a valve member moveable between a closed position and an open position, in use the main valve having an upstream side and a downstream side;
a pressure equalizing assembly for equalizing the fluid pressure across the main valve, the pressure equalizing assembly comprising a line extending from the upstream side of the main valve to the downstream side of the main valve and a pressure equalizing valve assembly; wherein the pressure equalizing valve assembly comprises:
a valve housing;
a first port for fluid to enter or leave the valve housing;
a second port for fluid to leave or enter the valve housing;
a flow control assembly disposed within the valve housing between the first and second ports, the flow control assembly comprising:
a cage defining apertures from an outermost cylindrical surface to an innermost cylindrical surface, wherein the apertures extend through the cage at an angle from the outermost cylindrical surface to the innermost cylindrical surface, the apertures are configured to provide passage for fluid passing between the first port and the second port; and
a closure assembly configured to open and close the apertures, wherein the closure assembly comprises:
a first closure member disposed within the cage; and
a second closure member disposed outside the cage, wherein the first and second closure members are configured to move with respect to the cage between a first closed position that closes the apertures in the flow control assembly, and a second open position, in which the apertures in the flow control assembly are open, and wherein the fluid flowing through the pressure equalizing assembly flows unobstructed between the first port and the cage and between the second port and the cage in the second open position.

2. The valve assembly according to claim 1, wherein the main valve is a ball valve, a butterfly valve or a gate valve.

3. The valve assembly according to claim 1, wherein the line extends between the upstream and downstream sides exterior to the main valve.

4. The valve assembly according to claim 1, wherein the pressure equalizing valve assembly is arranged whereby all the fluid entering the valve housing through either the first port or second port flows through the flow control assembly and leaves the valve housing through the corresponding first or second port.

5. The valve assembly according to claim 1, wherein the first port is in fluid flow connection with the outside of the cage, such that fluid entering the valve housing through the first port is provided to an exterior of the cage and flows through the cage to an interior thereof.

6. The valve assembly according to claim 5, wherein the second port is in fluid flow connection with the interior of the cage, such that fluid entering the valve housing through the second port is provided to the interior of the cage and flows through the cage to an outside of the cage.

7. The valve assembly according to claim 1, wherein the valve housing comprises a cavity therein connected to the first port, the flow control assembly being disposed within the cavity.

8. The valve assembly according to claim 7, wherein the flow control assembly is arranged centrally within the cavity, such that the cavity extends around the flow control assembly.

9. The valve assembly according to claim 7, wherein the first port is arranged in the valve housing to extend tangentially to a wall of the cavity.

10. The valve assembly according to claim 9, wherein the first port forms an opening in the wall that defines the cavity to direct fluid into an involute channel or groove extending around the wall of the cavity.

11. The valve assembly according to claim 1, wherein the cage is a generally cylindrical tube.

12. The valve assembly according to claim 11, wherein the apertures are arranged in the flow control assembly in a plurality of rows, each row containing one or more apertures, with adjacent rows being separated by a land or region having no apertures therethrough.

13. The valve assembly according to claim 12, wherein centers of the apertures in adjacent rows of the flow control assembly are offset from each other circumferentially around an exterior surface of the flow control assembly.

14. The valve assembly according to claim 13, wherein the apertures are arranged such that adjacent apertures in adjacent rows extend in a helical pattern along and around the flow control assembly.

15. The valve assembly according to claim 12, wherein the apertures extend inwards, in a plane perpendicular to a longitudinal axis of the flow control assembly at an angle to the radial direction.

16. The valve assembly according to claim 15, wherein the apertures extend through the flow control assembly and open tangentially to an inner surface of the flow control assembly.

17. The valve assembly according to claim 12, wherein the apertures extend through the flow control assembly at an angle to a plane perpendicular to a longitudinal axis of the flow control assembly and at an angle to the radial direction.

18. The valve assembly according to claim 17, wherein the apertures extend at an angle to the plane perpendicular to the longitudinal axis in either an upstream direction or downstream direction of fluid within the flow control assembly.

19. The valve assembly according to claim 1, wherein the first and second closure members are moveable together.

20. The valve assembly according to claim 19, wherein the first and second closure members are sized and arranged differently with respect to one another and the cage, such that in a given position of the closure assembly, the first and second closure members are obscuring and closing a different number of apertures.

21. A valve assembly, comprising:
a pressure equalizing valve assembly configured to equalize fluid pressure across a main valve, wherein the pressure equalizing valve assembly comprises:
   a valve housing comprising a wall that defines a cavity;
   a first port, wherein the first port fluidly communicates with the cavity and extends tangentially to the wall of the cavity;
   a second port in fluid communication with the cavity;
   a flow control assembly disposed within the valve housing between the first and second ports, wherein fluid entering and exiting the valve housing flows through the flow control assembly, and the flow control assembly comprises:
      a cage defining apertures from an outermost cylindrical surface to an innermost cylindrical surface of the cage, wherein the apertures extend through the cage at an angle from the outermost cylindrical surface to the innermost cylindrical surface to enable the fluid to pass through the flow control assembly; and
      a closure assembly configured to move with respect to the cage between a first closed position and a second open position to open and close the apertures in the flow control assembly, wherein the fluid flowing through the closure assembly flows unobstructed between the first port and the cage and between the second port and the cage in the second open position.

22. The valve assembly of claim 21, comprising a seating ring that threadingly couples to the valve housing.

23. A valve assembly, comprising:
a pressure equalizing valve assembly configured to equalize fluid pressure across a main valve, wherein the pressure equalizing valve assembly comprises:
   a valve housing comprising a wall that defines a cavity;
   a first port in fluid communication with the cavity;
   a second port in fluid communication with the cavity;
   a flow control assembly disposed within the valve housing between the first and second ports, wherein fluid entering and exiting the valve housing flows through the flow control assembly, and the flow control assembly comprises:
      a cage defining a plurality of apertures that enable the fluid to pass through the flow control assembly; and
      a closure assembly configured to open and close the apertures, wherein the closure assembly comprises:
         a sleeve configured to surround the cage, wherein the sleeve is configured to move with respect to the cage between a first closed position that closes the apertures in the cage, and a second open position in which the apertures in the cage are open, wherein the sleeve comprises a first end with a first angled surface defining a first angle with respect to a longitudinal axis of the cage, the first angled surface is configured to form a sealing interface with a second angled surface in the valve housing, the second angled surface defining a second angle with respect to the longitudinal axis, and wherein the first angle is different than the second angle.

24. The valve assembly of claim 23, wherein the sleeve comprises a first surface portion and a second surface portion that form a ridge, and wherein the ridge is configured to form a seal with a seat ring.

* * * * *